Patented Apr. 10, 1951

2,548,757

UNITED STATES PATENT OFFICE 2,548,757

PREPARATION OF SYNTHETIC RUBBER-CARBON BLACK MIXTURES

James W. Adams, Seymour, Conn., assignor to United States Rubber Company, New York, N. Y., a corporation of New Jersey No Drawing. Application March 10, 1950, Serial No. 149,030

4 Claims. (Cl. 260—17.4)

This invention relates to the preparation of synthetic rubber-carbon black mixtures.

Synthetic rubber-carbon black mixtures for further compounding and manufacture into finished articles are commonly prepared today by mixing an aqueous suspension of the carbon black with the synthetic rubber latex and coagulating the mixture in the usual manner with salt and/or acid coagulating agents, filtering the crumb coagula, and washing and drying to form a synthetic rubber-carbon black mix which may be baled and shipped similarly to the ordinary synthetic rubber. Such commercial practice is described in the article by J. C. Madigan and the present applicant entitled "Latex Incorporated Carbon Black for Synthetic Rubber" in Chemical Engineering Progress, 44, 815–820 (November 1948). The main purpose of thus mixing the carbon black with the synthetic rubber latex before coagulation is to reduce the large amount of energy that would ordinarily be required to mix and properly disperse the dry carbon black into the crude synthetic rubber on a rubber mill or in an internal mixer. Various sulfated and sulfonated surface-active dispersing agents have been suggested for preparing the aqueous suspensions of carbon black. Partially desulfonated sodium lignin sulfonate and condensed sodium alkylnaphthalene sulfonate are presently used in commercial practice for this purpose. A disadvantage of such sulfated and sulfonated dispersing agents is that they are not completely deactivated at the low pH's at which the latex-carbon black mixture is coagulated (pH's in the range of 3 to 4), and this results in loss of carbon black in the filtrate from the coagulated rubber-carbon black crumbs by virtue of the retained dispersing activity of the sulfated and sulfonated surface-active dispersing agents which are known to protect dispersions at pH's above and below 7.

I have found that one of the constituents of the bark of the Douglas fir tree is an excellent dispersing agent for carbon black in making aqueous suspensions of carbon black for mixing with synthetic rubber latex before coagulation of such mixture in the preparation of synthetic rubber-carbon black mixes. Little, if any, carbon black is lost as fines in the filtrate from the synthetic rubber-carbon black crumb coagula with this dispersing agent for the carbon black. There are indications that this material also imparts improved properties to the synthetic rubber-carbon black mixes by way of increased tensile strength of compounds prepared therefrom.

In carrying out the present invention, the carbon black is dispersed in water, prior to mixing with the synthetic rubber latex and coagulating in the conventional manner, with the aid of the amorphous material obtained from the highly parenchymous tissue of the bark of the Douglas fir tree. Douglas fir bark may be ground and separated into three basic components, the flake-like particles of cork, the stiff fibers commonly described as bast fibers, and the amorphous particles obtained from the highly parenchymous tissue of the bark (see "Douglas Fir Bark Utilized as a Filler" by Elliot Marple in "Plastics" for August 1947, pages 44, 65–67). The amorphous material last mentioned is the material used to disperse the carbon black in water according to the present invention. It is marketed as a fine powder, 90% of which passes through a 325 mesh screen, and the major proportion of which is soluble in dilute alkali hydroxide solutions, such as 0.5 to 5% solutions of sodium, potassium and ammonium hydroxides. These alkali hydroxide solutions of the amporhous material are used to disperse the carbon black according to the present invention. The alkali solutions of the powdered amorphous material will contain some insoluble material suspended therein, mostly bast fibers, and may be clarified before being used to disperse the carbon black in water, or the solutions may be used without clarification. The insoluble material which is mostly bast fibers does no harm in the final synthetic rubber-carbon black mixture. Lower concentrations of alkali hydroxide give larger amounts of undissolved material and require somewhat more of the alkali hydroxide solution of the amorphous material to give a fluid aqueous slurry of the carbon black. For example, 30 parts of the powdered amorphous material separated from the ground Douglas fir bark were mixed with 270 parts of 1.3%, 2.0% and 2.7% solutions of sodium hydroxide and heated for 30 minutes at 90–100° C. All parts and percentages referred to herein are by weight. The undissolved residue in the 2.7% NaOH solution was 21%, in the 2.0% NaOH solution was 30%, and in the 1.3% NaOH solution was 40%. Portions of each of these suspensions (or solutions of the active dispersant containing the insoluble fraction), were centrifuged at 1500 revolutions per minute for 20 minutes. The thus clarified solutions and the original suspensions were evaluated as dispersing agents in the preparation of a 20% aqueous dispersion or slurry of a high abrasion furnace type of carbon black by determining the amount of clarified solution or original suspension necessary to produce a fluid slurry of the carbon black under conditions of violent agitation. The results were converted to percent of total solids in the clarified suspension or in the original suspension, based on the carbon black to give the fluid slurry. With the 2.7% NaOH solution, it was necessary to use 3.6% of solids of the unfiltered suspension (which is equivalent to original powdered amorphous material), or 2.8% of solids of the clarified solution to produce a 20% fluid carbon black slurry. With the 2.0% NaOH solution, it was necessary to use 4.4% of solids of the unfiltered suspension of the powdered amorphous material, or 2.7% of the solids of the clarified solution. With the 1.3% NaOH solution, it was necessary to use 5.6% of solids of the unfiltered suspension of the powdered amorphous material, or 3.3% of solids of the clarified solution. In general, 1 to 10 parts of the solids of the unfiltered alkali hydroxide solution of the amorphous material, or 0.5 to 5 parts of the solids of the clarified or filtered alkali hydroxide solution, per 100 parts of carbon black, will be used to prepare satisfactory fluid slurries or aqueous dispersions of various types of carbon black.

The carbon black which is made into an aqueous slurry and mixed with the synthetic rubber latex, may be any of the carbon blacks used with synthetic rubbers, such as reinforcing or semi-reinforcing channel blacks or furnace blacks, e. g., easy processing channel (EPC) blacks, high abrasion furnace (HAF) blacks, high modulus furnace (HMF) blacks, and semi-reinforcing furnace (SRF) blacks. While carbon black is produced as an extremely fine powder, it cannot be shipped readily long distances or handled in such a state because of its tendencies to pack, bridge, gush, and fly about. It is therefore usually supplied in pellet form and such pellets should be reground in preparing the aqueous slurries. If the fine powdered type of carbon black is available, it may be used as such in preparing an aqueous suspension of the carbon black. Such original powdered form of carbon black may be dispersed directly in water with the unclarified or clarified alkali-hydroxide solution of the powdered amorphous material of the present invention in conventional mixing equipment or colloid mills. Where the carbon black is received in pelletized form, the pellets may be dry ground in an impact pulverizer (such as a Mikro pulverizer) before being dispersed in water, or the pelletized carbon black may be wet ground directly with water and the alkali hydroxide solution of the amorphous material in a colloid mill. These methods of preparing aqueous slurries of carbon black with conventional dispersing agents are known (see article in Chemical Engineering Progress, 44, 815–820 above referred to). In general the carbon black slurry will have a solids concentration in the range of 10 to 30%; the mixture of the synthetic rubber latex and carbon black slurry will have a solids concentration in the range of 13 to 35%; and the ratio of carbon black to rubber in the dried mixture will be from 30 to 100 parts of carbon black per 100 parts of synthetic rubber.

As is known, synthetic rubber latices are prepared by the emulsion polymerization of unsaturated monomers, e. g. butadiene-1,3 and styrene in the preparation of GR–S latex. The amount of emulsifying and dispersing agents used is not critical, generally 3 to 6 parts per 100 parts of polymerizable monomers being used. Soaps are the preferred emulsifying and dispersing agents in the present invention, but up to 0.5 part of sulfated or sulfonated surface-active emulsifying and dispersing agents per 100 parts of polymerizable monomers may be included in the emulsifying and dispersing formulation. The polymerization is allowed to take place at temperatures varying from 0° F. to 150° F. Conventional GR–S polymerization is made to take place at about 122° F. and so-called cold GR–S is polymerized at about 41° F. Various known catalysts and regulators are used in these polymerizations. In practice, the emulsion polymerization is not allowed to go to completion because of the excessive time necessary for complete conversion of the polymerizable monomers and because of the undesirable properties that may be imparted to the synthetic rubber when the polymerization has been permitted to go to completion. The polymerization is usually permitted to go to around 50 to 85% of completion, as determined by consumption of polymerizable monomers and is stopped by the addition of a so-called shortstopping agent which prohibits further polymerization of the monomers during their removal. Hydroquinones and similar materials are common shortstopping agents. After addition of the shortstopping agent, the unreacted residual polymerizable monomers are removed from a synthetic rubber latex, as by venting off monomers which are gaseous at atmospheric pressure, e. g. butadiene-1,3, and steam distilling under reduced pressure the residual higher boiling point or liquid monomers, e. g., styrene, and the thus recovered polymerizable monomers may be utilized in subsequent emulsion polymerizations. In general, the concentration of the latex will be from 15 to 40% solids content.

The polymerizable material in the preparation of the synthetic rubber latex may be one or a mixture of butadienes-1,3, for example, butadiene-1,3, methyl-2-butadiene-1,3 (isoprene), chloro-2-butadiene-1,3 (chloroprene), piperylene,2,3-dimethyl butadiene-1,3. The polymerizable material, as is known, may be a mixture of one or more such butadienes with one or more polymerizable compounds which are capable of forming rubber copolymers with butadienes-1,3; for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of such monoolefines containing a terminal methylene ($CH_2=C<$) group and are copolymerizable with butadienes-1,3, are aryl olefines, such as styrene, vinyl naphthylene; alpha methyl styrene, para chloro styrene, dichloro styrene; the alpha methylene carboxylic acids and their esters, nitriles and amides, such as acrylic acid, methyl acrylate, methyl methacrylate, acrylonitrile, methacrylonitrile, methacrylamide; methyl vinyl ether, methyl vinyl ketone; vinylidene chloride.

The following illustrates the invention:

*Example I*

A GR–S latex was prepared as follows: An emulsifying solution of 4.7 parts of sodium soap of hydrogenated rosin acid, 0.1 part of polymerized sodium salts of alkyl naphthalene sulfonic acid (alkyl, short chain), and 0.1 part of sodium hydroxide in 50 parts of water was charged into an autoclave type reactor with 100 parts of water. 3 parts of dextrose in 10 parts of water; 0.6 part of sodium pyrophosphate and 0.4 part of trisodium phosphate dodecahydrate in 10 parts of water; and 0.1 part of ferrous sulfate in 10 parts of water were mixed under a blanket of nitrogen, heated at 140° F. for ten minutes, cooled to room temperature, and charged into the reactor. 23 parts of styrene, 72 parts of butadiene-1,3 and 0.19 part of a mixed tertiary alkyl mercaptan modifier or regulator having an average of 12 carbon atoms were next added to the charge, and the charge was cooled to 41° F. while being continuously agitated. When the batch had reached the desired temperature of 41° F., a solution of 5 parts of styrene and 0.15 part of cumene hydroperoxide, which had been chilled to 41° F. was injected to start polymerization. The temperature of the mixture was held at 41° F. by circulating a refrigerated solution around the reactor and the reaction was allowed to proceed while being agitated until the latex contained approximately 20% solids. Polymerization was stopped by adding 0.2 part of ditertiary butyl hydroquinone shortstop in aqueous dispersion, and the unreacted butadiene-1,3 and styrene were removed by venting and steam distillation. The cumene hydroperoxide used is a peroxygen type catalyst; the dextrose, sodium pyrophosphate, and ferrous sulfate heptahydrate are activators for the cumene peroxide catalyst; the trisodium phosphate dodecahydrate is a buffer. To the latex was added in emulsion form 1.5 parts of an antioxidant (high temperature reaction product of diphenylamine and acetone) per 100 parts of solids of the latex.

50 parts dry weight of carbon black slurries of 20% solids concentration were prepared by adding a high abrasion furnace black to suspensions or solutions of various dispersing agents in water and agitating the mixtures in a high speed stirrer for three minutes. Minimum amounts of the dispersing agents to give fluid slurries were used. In the first slurry, 2.5 parts dry weight of an unfiltered 2% NaOH aqueous extract of the powdered amorphous material of the present invention was the dispersing agent. In the second slurry, 1.75 parts dry weight of a clarified 2% NaOH aqueous extract of the powdered amorphous material was the dispersing agent. In the third slurry, 1.25 parts dry weight of an aqueous solution of the present commercially used partially desulfonated sodium lignin sulfonate was the dispersing agent.

100 parts dry weight of the above 20% solids synthetic rubber latex were mixed with each of the three carbon black slurries of 50 parts dry weight. The carbon black-latex mixtures were flocculated by adding 0.8% sulfuric acid until flocculation was complete to yield a crumb that was subsequently filtered, washed and dried. The filtrates from the mixtures prepared from the first two slurries were lighter in color than the filtrate from the third slurry indicating less loss of carbon black fines. Conventional test compounds were made of each dried rubber-carbon black mixture by adding to 270 grams of the mixture on a laboratory rubber mill, 9 grams of zinc oxide, 3.6 grams of sulfur, 2.7 grams of stearic acid and 5.5 grams of benzothiazyl disulfide accelerator. Samples of the compounds were vulcanized at 292° F. for 25 minutes, 50 minutes and 100 minutes, and test pieces were cut out and the tensile strengths measured. The maximum tensile strength of the compound made from the first carbon black slurry (dispersed on the unclarified solution of the amorphous material of the present invention) was 4370 lbs/sq. in. The maximum tensile strength of the compound made from the second carbon black slurry (dispersed on the clarified solution of the amorphous material of the present invention) was 3990 lbs./sq. in. The maximum tensile strength of the compound made from the third carbon black slurry (dispersed on the commercial partially desulfonated sodium lignin sulfonate) was 3500 lbs./sq. in. Commercial GR-S rubber-carbon black runs, in tests similar to the above using partially desulfonated sodium lignin sulfonate as the dispersing agent for the carbon black slurry, average around 3500 lbs./sq. in., and only exceptionally reach 3800 lbs./sq. in. The test runs with the dispersing agent of the present invention for the carbon black gave higher tensile strengths, as shown above.

*Example II*

In this case, another run of 20% solids GR-S latex prepared according to the method used in Example I was used. The 20% aqueous slurries of a high abrasion furnace carbon black were prepared, the first two slurries with 3 parts of partially desulfonated sodium lignin sulfonate per 100 parts of carbon black as the dispersing agent, and the third slurry with 5 parts per 100 parts of carbon black of the amorphous material of the present invention as a 2% sodium hydroxide unclarified solution as the dispersing agent.

500 parts of the 20% latex (wet weight) and 250 parts (net weight) of each of the three 20% carbon black slurries were mixed and coagulated as in Example I. The filtrate from the mixture made from the third slurry was clearer than the filtrates from the mixtures made from the first two slurries. Test compounds were made and vulcanized, and test pieces were cut out as in Example I and tensiles measured. The compounds made from the first two carbon black slurries with partially desulfonated sodium lignin sulfonate as the dispersing agent gave maximum tensile strengths of 3290 and 3680 lbs./sq. in. The compound made from the third carbon black slurry with the alkali hydroxide solution of the amorphous material of the present invention as the dispersing agent gave a maximum tensile strength of 3940 lbs./sq. in.

In view of the many changes and modifications that may be made without departing from the principles underlying the invention, reference should be made to the appended claims for an understanding of the scope of the protection afforded the invention.

Having thus described my invention what I claim and desire to protect by Letters Patent is:

1. The process which comprises mixing with synthetic rubber latex an aqueous dispersion of carbon black containing an alkali hydroxide solution of the amorphous particles obtained from the highly parenchymous tissue of the bark of the Douglas fir tree, coagulating the mixture, and separating the coagulum therefrom.

2. The process of claim 1 in which the synthetic rubber latex is an aqueous emulsion polymerizate of polymerizable material selected from the group consisting of butadienes-1,3 and mixtures of butadienes-1,3 with up to 70% of said mixture of material which contains a single $CH_2=C<$ group and is copolymerizable with butadienes-1,3.

3. The process of claim 1 in which the synthetic rubber latex is an aqueous emulsion polymerizate of a mixture of butadiene-1,3 and up to 70% of said mixture of styrene.

4. The process of claim 1 in which the synthetic rubber latex is an aqueous emulsion polymerizate of a major proportion of butadiene-1,3 and a minor proportion of styrene.

JAMES W. ADAMS.

REFERENCES CITED

The following references are of record in the file of this patent:

Silvacon Bulletin 150 of the Weyerhaeuser Timber Company (1949), 4 pages.